United States Patent
Okazaki et al.

(10) Patent No.: US 10,792,864 B2
(45) Date of Patent: Oct. 6, 2020

(54) LAMINATION MOLDING APPARATUS

(71) Applicant: SODICK CO., LTD., Kanagawa (JP)

(72) Inventors: Shuji Okazaki, Kanagawa (JP);
Tsuyoshi Saito, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 0 days.

(21) Appl. No.: 16/578,415

(22) Filed: Sep. 23, 2019

(65) Prior Publication Data

US 2020/0101669 A1    Apr. 2, 2020

(30) Foreign Application Priority Data

Sep. 27, 2018 (JP) .................................. 2018-181262

(51) Int. Cl.
| | |
|---|---|
| *B29C 67/00* | (2017.01) |
| *B29C 64/357* | (2017.01) |
| *B33Y 30/00* | (2015.01) |
| *B29C 64/227* | (2017.01) |
| *B29C 64/245* | (2017.01) |
| *B33Y 40/00* | (2020.01) |

(52) U.S. Cl.
CPC .......... *B29C 64/357* (2017.08); *B29C 64/227* (2017.08); *B29C 64/245* (2017.08); *B33Y 30/00* (2014.12); *B33Y 40/00* (2014.12)

(58) Field of Classification Search
CPC ..... B29C 64/153; B29C 64/232; B29C 64/20; B33Y 30/00; B33Y 40/00
See application file for complete search history.

(56) References Cited

U.S. PATENT DOCUMENTS

| 5,387,380 A | 2/1995 | Cima et al. | |
|---|---|---|---|
| 6,932,935 B1 * | 8/2005 | Oberhofer | B29C 64/153 |
| | | | 264/497 |
| 8,753,105 B2 * | 6/2014 | Scott | B29C 64/20 |
| | | | 425/338 |
| 9,839,960 B2 | 12/2017 | Okazaki et al. | |

(Continued)

FOREIGN PATENT DOCUMENTS

| JP | H07507508 | 8/1995 |
|---|---|---|
| JP | 4996672 | 8/2012 |

(Continued)

OTHER PUBLICATIONS

"Office Action of Japan Counterpart Application," with machine English translation thereof, dated Apr. 8, 2019, p. 1-p. 4.

*Primary Examiner* — Joseph S Del Sole
*Assistant Examiner* — Thu Khanh T Nguyen
(74) *Attorney, Agent, or Firm* — JCIPRNET

(57) ABSTRACT

A lamination molding apparatus includes a table, powder holding walls, a table driving device, a bucket, and a cover. The powder holding walls surround the table and hold material powder together with the table. The table driving device includes a linear actuator for outputting linear motion and a guide for transmitting the linear motion to the table and moving the table in a vertical direction. The bucket is disposed under the table and stores the material powder falling from between the table and the powder holding walls. The cover surrounds the table driving device between the table and the bucket. At least one portion of the linear actuator and the guide surrounded by the cover or the bucket is arranged along the vertical direction.

12 Claims, 7 Drawing Sheets

(56) References Cited

U.S. PATENT DOCUMENTS

| 10,046,393 B2 | 8/2018 | Okazaki et al. |
| 2009/0287032 A1 | 11/2009 | Brehme et al. |
| 2015/0202687 A1* | 7/2015 | Pialot .................... B29C 64/153 |
| | | 419/55 |

FOREIGN PATENT DOCUMENTS

| JP | 4996683 | 8/2012 |
| JP | 2017109373 | 6/2017 |

* cited by examiner

LAMINATION MOLDING APPARATUS

CROSS-REFERENCE TO RELATED APPLICATION

This application claims the priority of Japan patent application serial no. 2018-181262, filed on Sep. 27, 2018. The entirety of the above-mentioned patent application is hereby incorporated by reference herein and made a part of this specification.

BACKGROUND

Technical Field

The disclosure relates to a lamination molding apparatus.

Related Art

As a lamination molding technique for molding a desirable three-dimensional molding object, a method called powder bed fusion is known. In a lamination molding apparatus using powder bed fusion, at first, material powder is uniformly spread on a molding table, and a material powder layer is formed. Next, a predetermined position of the material powder layer is irradiated with a laser beam and sintered, and a sintered layer is formed. Then, the material powder is uniformly spread on the sintered layer and a new material powder layer is formed, the new material powder layer is irradiated with the laser beam and sintered, and thereby a new sintered layer bonded with the sintered layer below is formed. By repeating the formation of the material powder layer and the sintered layer, the desirable three-dimensional molding object consisting of a sintered body in which a plurality of the sintered layers is laminated to be integrated is formed. However, an electron beam may be irradiated in place of the laser beam, and molten layers may be formed in place of the sintered layers.

The molding table is configured to be vertically movable in a molding region which is a region in which the desirable three-dimensional molding object can be formed. In the formation of the material powder layer, the molding table is lowered by a thickness of one material powder layer, and the material powder supplied to the molding region is levelled by a blade or the like and the material powder layer with a desirable thickness is formed.

In a supply of the material powder, in a method recited in U.S. patent Ser. No. 10/046,393, a recoater head which is horizontally movable on the molding region is arranged. The material powder stored in the recoater head is discharged in the molding region. In addition, in other method recited in Japanese Patent No. 4996672, a material supply tank which has a vertically movable material table and stores the material powder is arranged. The material powder of a desired quantity is measured by raising the material table, and the material powder is transferred to the molding region by the blade and the like. Hereinafter, the molding table and the material table are collectively called table.

Under the table, a table driving device making the table move vertically is arranged. For example, a conventional table driving device recited in U.S. Pat. No. 9,839,960 includes a slide base disposed under the table and a guide base for supporting a feed screw. The feed screw includes a screw shaft, a nut screwed to the screw shaft, and a motor that rotates the screw shaft. The nut is fixed to a side surface of the slide base. By this configuration, highly accurate positioning of the table is realized.

For convenience of vertically moving the table, there is a slight gap between the table and powder holding walls surrounding the table. Therefore, the material powder may leak out from the gap and intrude into an internal mechanism of the lamination molding apparatus. Particularly, the material powder may adversely affect the table driving device and cause failure or reduced accuracy.

In the conventional table driving device, a guide such as the slide base and a linear actuator such as the feed screw are connected by side surfaces. In addition, it is necessary to fix the guide base to a main body of the lamination molding apparatus. Therefore, the table driving device becomes comparatively large. If both of the linear actuator and the guide of the table driving device are to be dustproofed by a cover, upsizing of the apparatus may be caused and a cover shape may be complicated, leading to difficulty in realizing the cover of the table driving device in design. In addition, even if the table driving device can be dustproofed, the material powder is scattered inside the lamination molding apparatus.

SUMMARY

According to an embodiment of the disclosure, a lamination molding apparatus is provided and the lamination molding apparatus includes: a table; powder holding walls which surround the table and hold material powder together with the table; a table driving device which includes a linear actuator for outputting linear motion and a guide for transmitting the linear motion to the table and moving the table along a vertical direction; a bucket which is disposed under the table and stores the material powder falling from between the table and the powder holding walls; and a cover which surrounds the table driving device between the table and the bucket, wherein at least one portion of the linear actuator and the guide surrounded by the cover or the bucket is arranged along the vertical direction.

DESCRIPTION OF THE EMBODIMENTS

The embodiments of the disclosure provide a lamination molding apparatus which can protect a table driving device from material powder intruding into an internal mechanism of the lamination molding apparatus from a gap between a table and powder holding walls and which can collect the intruding material powder.

In the lamination molding apparatus according to the embodiments of the disclosure, the intruding material powder is collected by a bucket. In addition, the table driving device is dustproofed by a cover. Herein, the linear actuator and the guide inside the cover or the bucket are arranged along a vertical direction which is a moving direction of the table, and thus the cover can be designed in a more compact and simpler shape.

In the following, embodiments of the disclosure are described using drawings. Various features shown in the embodiments below can be combined with each other.

Figure 1:
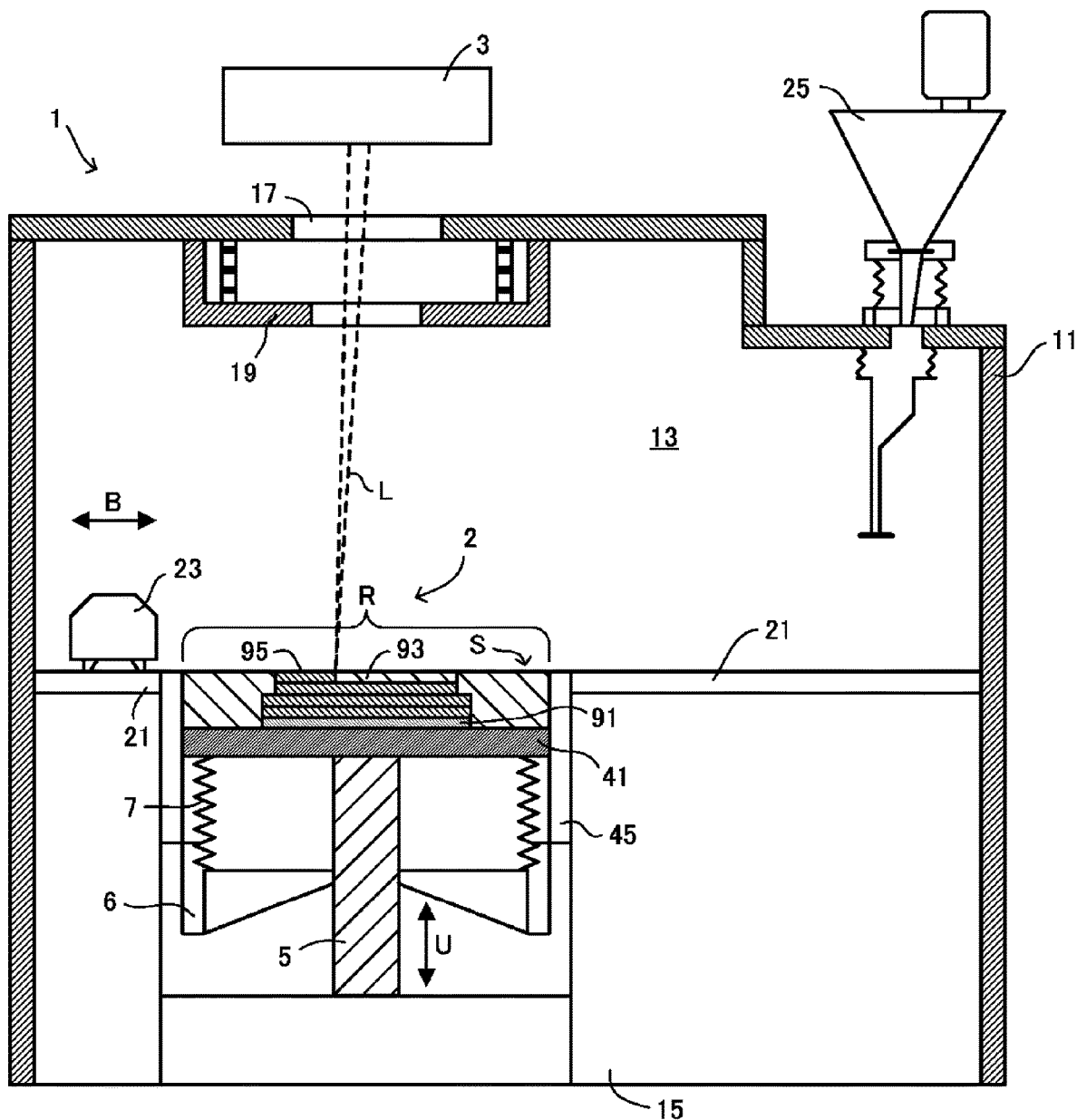
FIG. 1 is a schematic configuration diagram of a lamination molding apparatus of an embodiment.

As shown in FIG. 1, a lamination molding apparatus 1 of an embodiment of the disclosure includes a chamber 11, a material powder layer formation device 2, and a laser irradiation device 3.

Clean inert gas is supplied by an inert gas supply device not shown to the chamber 11 which covers a required molding region R. In addition, the inert gas including fume generated during sintering of a material powder layer 93 is discharged from the chamber 11. In this way, the chamber 11 is filled with the inert gas of a predetermined concentration, and the material powder layer 93 and sintered layer 95 are prevented from deteriorating. For example, the inert gas discharged from the chamber 11 may be removed of the fume by a fume collector not shown and is returned into the chamber 11. Furthermore, the inert gas is a gas which does not substantially react with the material powder that is used. For example, the inert gas is nitrogen or argon.

As shown in FIG. 1, the material powder layer formation device 2 is disposed in a molding room 13 inside the chamber 11. The material powder layer formation device 2 forms the material powder layer 93 for each of a plurality of division layers which is formed by dividing a desirable three-dimensional molding object at a predetermined height in the molding region R. The material powder layer formation device 2 includes a base 21 and a recoater head 23. The base 21 is arranged on a bed 15 which is a foundation of the lamination molding apparatus 1 and contains the molding region R. The recoater head 23 is arranged on the base 21 and reciprocates in a horizontal direction indicated by an arrow B. Blades are arranged on both side surfaces of the recoater head 23. The material powder is supplied from a material supply device 25 to the recoater head 23 and the recoater head 23 reciprocates while discharging the material powder contained therein from a bottom surface. The blades flatten the discharged material powder to form the material powder layer 93.

In the molding region R, a table 41 moveable along a vertical direction by a table driving device 5 is disposed. Hereinafter, a movement direction of the table 41 indicated by an arrow U is called a U-axis direction. The table 41 in the embodiment is a molding table on which the desirable three-dimensional molding object is formed. That is, the material powder is uniformly spread on the plurality of division layers which is formed by dividing the desirable three-dimensional molding object at a predefined thickness on the table 41 and the material powder layers 93 are formed. In other words, by reducing a height of the table 41 by the predefined thickness of the material powder layer 93 and moving the recoater head 23 along the horizontal direction, the material powder layer 93 of a desirable thickness is formed on the table 41. During the use of the lamination molding apparatus 1, usually a molding plate 91 is arranged on the table 41, and a first material powder layer 93 is formed on the molding plate 91. Furthermore, the molding region R is a region in which the lamination molding object can be formed, and the material powder layers 93 are formed in the molding region R.

Figure 2:
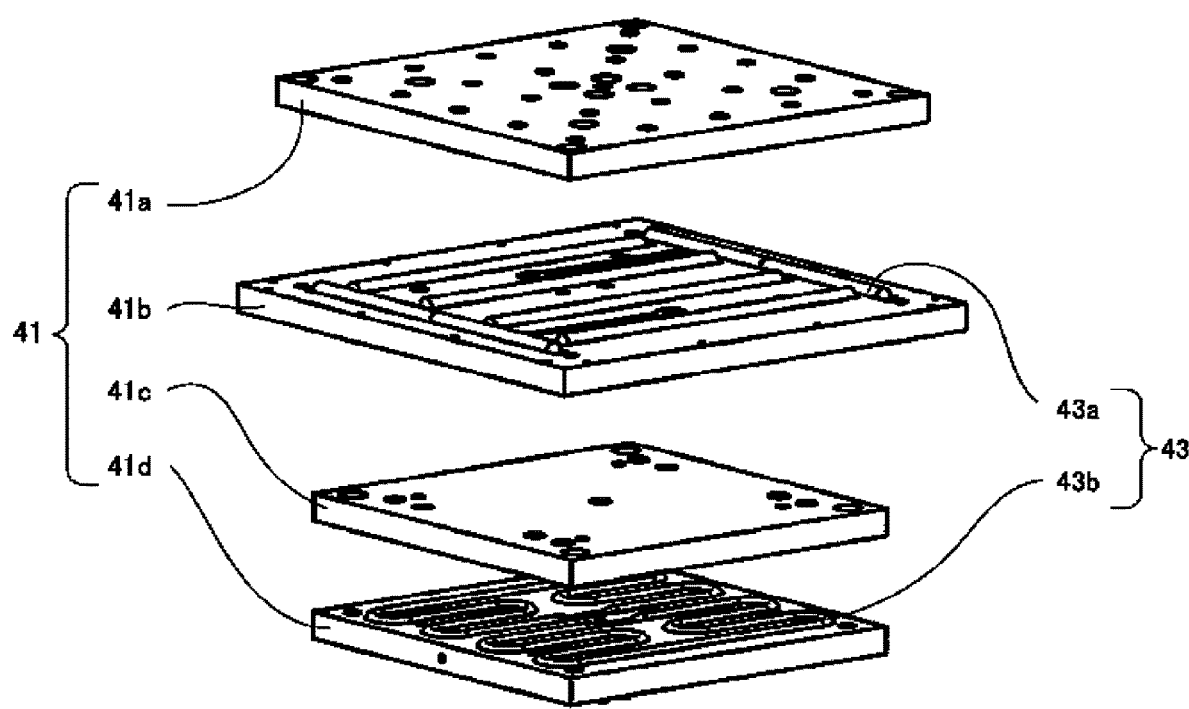
FIG. 2 is a schematic configuration diagram of a temperature adjustment device.

For example, a temperature adjustment device 43 configured to be capable of adjusting the table 41 to a desirable temperature may be disposed inside the table 41. As a specific configuration example, as shown in FIG. 2, the table 41 includes a top plate 41a and three support plates 41b, 41c, 41d. A heater 43a is disposed between the top plate 41a and the support plate 41b, and a cooler 43b is disposed between the support plate 41c and the support plate 41d. The heater 43a is, for example, an electric heater or a pipeline through which a heating medium flows. The cooler 43b is, for example, a pipeline through which a cooling medium flows. To prevent thermal displacement of the table driving device 5, a constant temperature section which is kept at a constant temperature may be disposed between the temperature adjustment device 43 and the table driving device 5. By the aforementioned configuration, the material powder layers 93 and the sintered layers 95 can be controlled at the desirable temperature.

Figure 3:
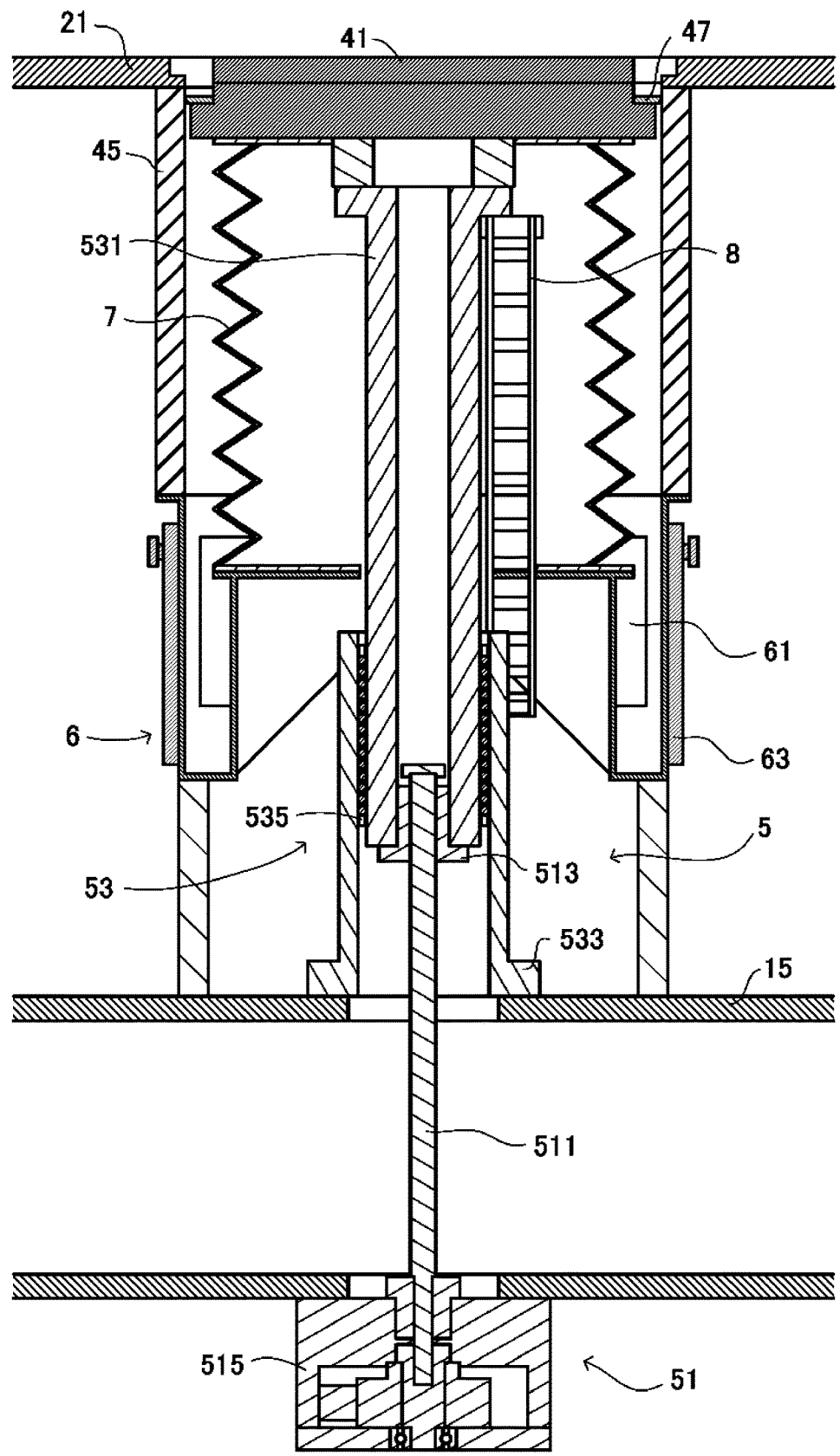
FIG. 3 is an enlarged view of a table driving device and shows a state in which a table is in an upper limit position.
Figure 4:
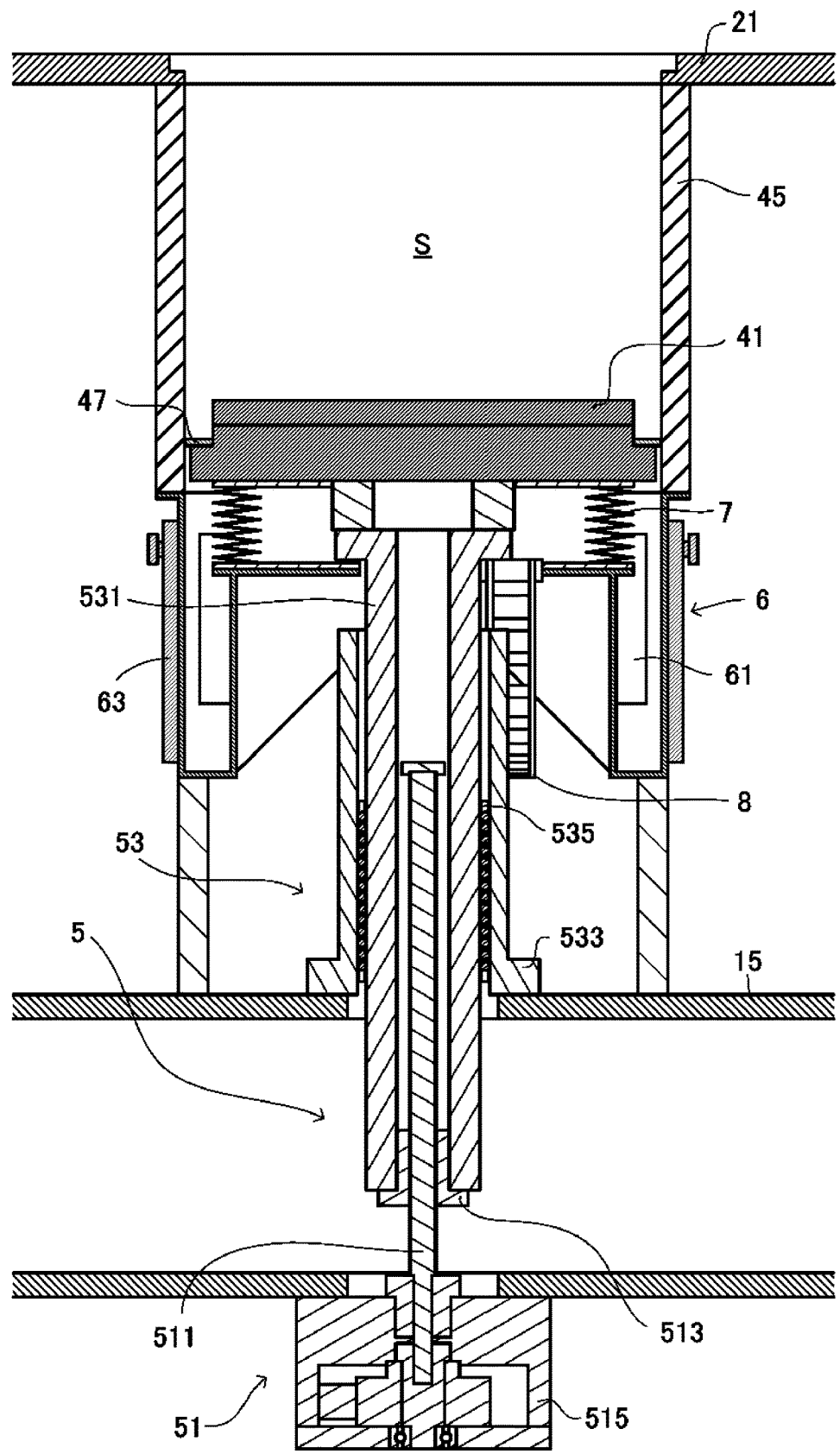
FIG. 4 is an enlarged view of the table driving device and shows a state in which the table is in a lower limit position.

Powder holding walls 45 are arranged around the table 41. The material powder is held in a powder holding space S surrounded by the powder holding walls 45 and the table 41. As shown in FIG. 3 and FIG. 4, the table 41 and the powder holding walls 45 are not in directly contact, and a seal 47 arranged on a periphery of the table 41 is in contact with the powder holding walls 45. When the table 41 is moved in the U-axis direction, the seal 47 slides on the powder holding walls 45. By the aforementioned configuration, an amount of the material powder leaking from the powder holding space S to an underneath of the table 41 can be suppressed to a small amount.

As shown in FIG. 3 and FIG. 4, under the table 41, the table driving device 5, a bucket 6 and a cover 7 are disposed. The table driving device 5 includes a linear actuator 51 for outputting linear motion and a guide 53 for transmitting the linear motion to the table 41 and moving the table 41 in the U-axis direction. The bucket 6 stores the material powder falling from between the table 41 and the powder holding walls 45. The cover 7 surrounds the table driving device 5 between the table 41 and the bucket 6 and prevents the material powder leaked out from entering the table driving device 5. Herein, at least the linear actuator 51 and the guide 53 inside the cover 7 or the bucket 6 are arranged on a straight line along the U-axis direction. Therefore, the table drive apparatus 5 can be disposed in a space-saving manner on a substantially central axis of the table 41, and the entire table drive apparatus 5 between the table 41 and the bucket 6 can be easily covered by the cover 7.

The linear actuator 51 is, for example, a feed screw which has a screw shaft 511 extending in the U-axis direction, a nut 513 screwed to the screw shaft 511, and a motor 515 for rotating the screw shaft 511. Preferably, the linear actuator 51 is, for example, a ball screw, and the nut 513 moves via a ball contained between the screw shaft 511 and the nut 513.

Figure 5:
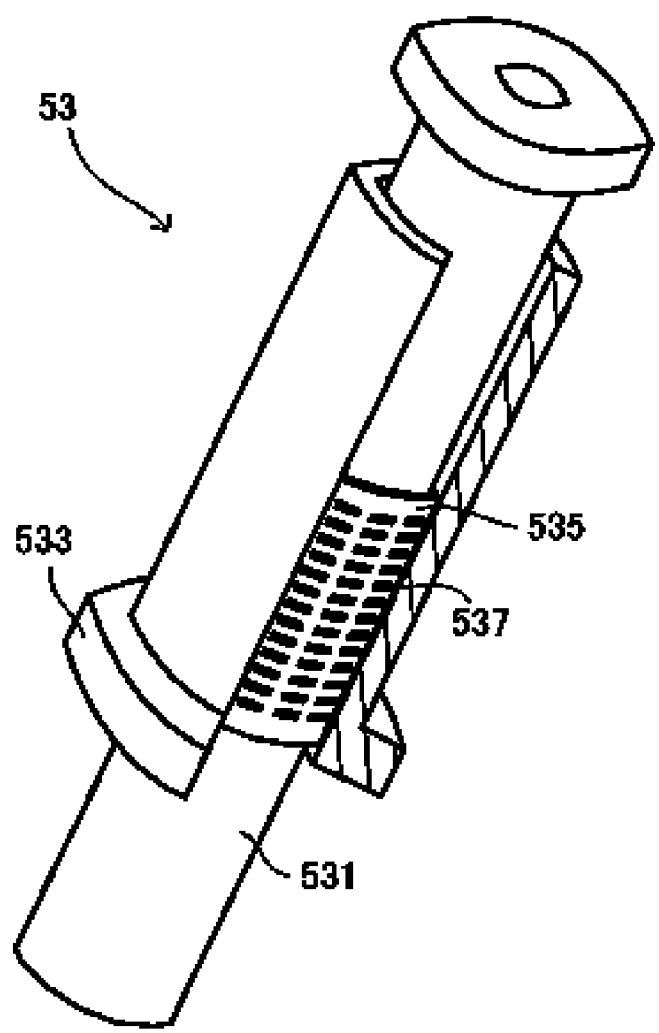
FIG. 5 is an enlarged view of a guide.

The guide 53 is, for example, a guide post having a post 531, a bushing 533, and a retainer 535. The screw shaft 511 is inserted through the post 531, and the nut 513 is fixed to a lower end side of the post 531. In addition, an upper end side of the post 531 is fixed to the table 41. The post 531 is inserted through the bushing 533, and a lower end side of the bushing 533 is fixed to a mechanical structure of the lamination molding apparatus 1, and here to the bed 15. As shown in FIG. 5, the retainer 535 holds rolling bodies 537 arranged between the post 531 and the bushing 533. The rolling body 537 may be a needle roller to obtain high rigidity. Furthermore, in FIG. 5, the bushing 533 is partially cut to display an internal structure of the guide 53.

According to the aforementioned linear actuator 51 and the guide 53, the screw shaft 511, the nut 513, the post 531 and the bushing 533 are arranged along the U-axis direction. Therefore, one portion of the linear actuator 51 and the guide 53 is covered by the cover 7 more easily. In addition, since the linear actuator 51 is inserted through the guide 53, a size in the U-axis direction of the table driving device 5 can be miniaturized.

Figure 6:
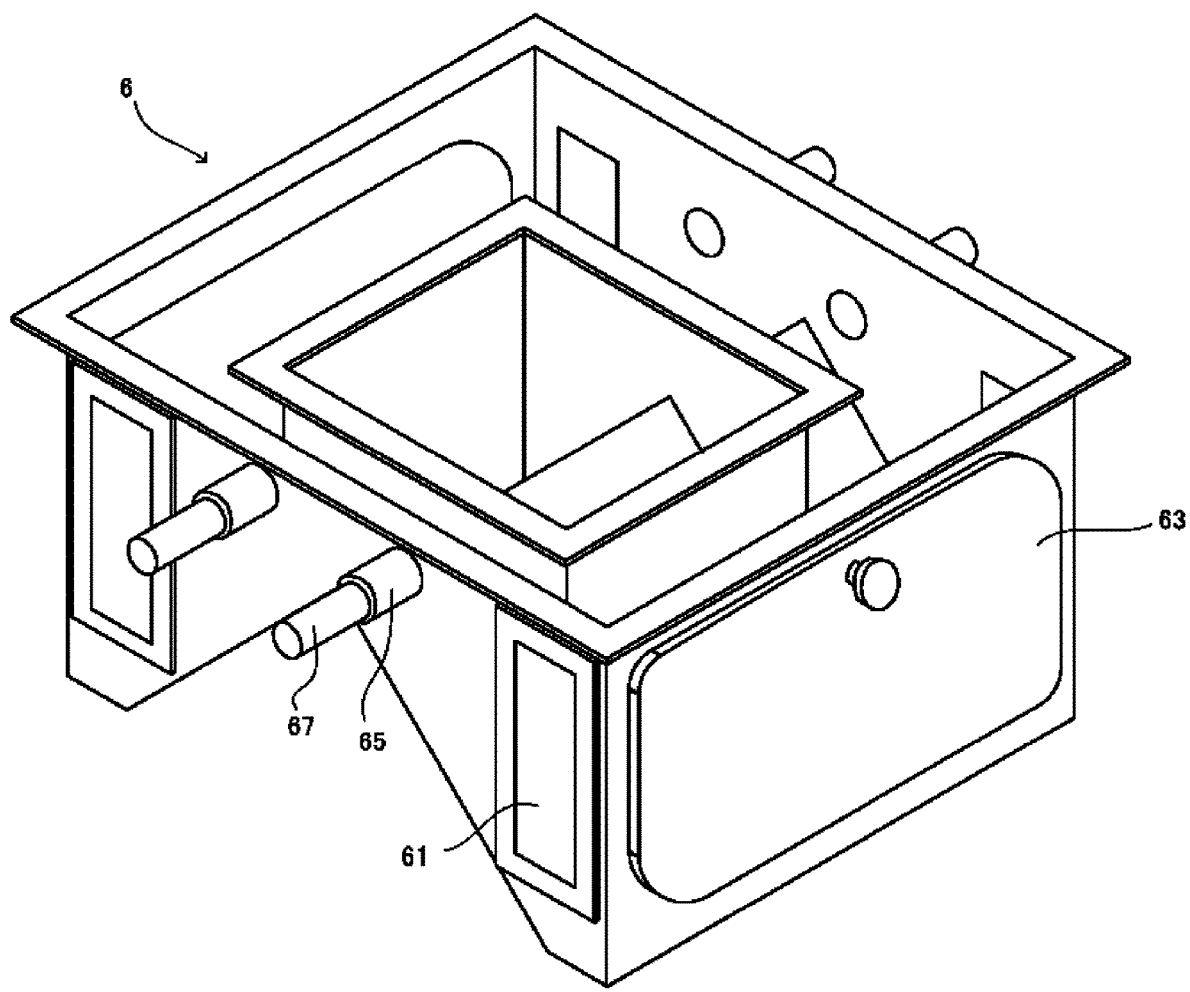
FIG. 6 is an enlarged view of a bucket.

As shown in FIG. 3, FIG. 4 and FIG. 6, the bucket 6 has a box-like shape being hollow inside and open on the top. In other word, the bucket 6 includes inner side surfaces surrounding the table driving device 5, outer side surfaces fixed to the powder holding walls 45, and a bottom surface connecting the inner side surfaces and the outer side surfaces. In the bucket 6, transparent windows 61 enabling the confirmation of the stored material powder are disposed. Furthermore, here, transparent means being permeable to the extent that the material powder inside the bucket 6 can be confirmed, including so-called semi-transparent. In addition, in the bucket 6, doors 63 being openable or detachable for discharging the stored material powder are disposed. According to the aforementioned bucket 6, an operator of the lamination molding apparatus 1 can confirm a storage amount of the material powder falling into the bucket 6 by the transparent window 61, and open or detach the door 63 as necessary to collect the material powder. In the bucket 6 of the embodiment, the doors 63 are disposed one each on a pair of opposing outer side surfaces, and the transparent windows 61 are disposed two each on a pair of outer side surfaces different from the outer side surfaces on which the doors 63 are disposed. However, the positions and the number of the transparent windows 61 and the doors 63 can be freely designed. Furthermore, to collect the material powder from the bucket 6, for example a suction nozzle is used. In addition, at least one portion of the bottom surface of the bucket 6 may be tilted so that the material powder is stored near the doors 63. In this way, the material powder can be collected easily.

The inert gas of the predetermined concentration may be filled in the bucket 6. In the embodiment, the inert gas filled in the molding room 13 is supplied to the bucket 6 through the gap between the table 41 and the powder holding walls 45. However, an inert gas supply port may be arranged on the bucket 6, and the inert gas may be directly supplied from the inert gas supply device not shown. Since the material powder is prevented from deteriorating by the inert gas, the material powder collected from the bucket 6 can be reused.

In the bucket 6 of the embodiment, the storage amount of the material powder can be confirmed visually by the operator via the transparent window 61; however, the situation that the storage amount reaches a predetermined amount may be detected by a sensor for example. In addition, collection of the material powder from the bucket 6 may be automated. For example, when it is detected by the sensor that the storage amount reaches the predetermined amount, the material powder may be collected by the suction nozzle or the like. The collected material powder may be returned to the material supply device 25.

The cover 7 has, for example, a bellows shape and is extendable corresponding to the movement of the table 41. In addition, an upper end side of the cover 7 is fixed to the table 41 and a lower end side of the cover 7 is fixed to the bucket 6.

According to the cover 7 above, when the table 41 is moved, atmosphere inside the cover 7 is compressed or expanded. Therefore, in the bucket 6, pressure equalization vents 65 for equalizing an atmosphere pressure inside the cover 7 and an atmosphere outside the cover 7 may be disposed. The pressure equalization vent 65 is a through vent through which an atmosphere inside the cover 7 and an atmosphere outside the cover 7 can flow. To prevent the material powder from passing through the pressure equalization vent 65, a filter 67 may be disposed in the pressure equalization vent 65. As shown in FIG. 6, four pressure equalization vents 65 of the embodiment are disposed in the bucket 6; however, positions and the number of the pressure equalization vents 65 can be freely designed.

Furthermore, in the cover 7, in addition to the table driving device 5, at least one pipe or at least one wire connected to the table 41 or near the table 41 may be stored. The pipe or wire include a wire for supplying electric power to the electric heater of the temperature adjustment apparatus 43, a pipe connected to the pipeline of the temperature adjustment apparatus 43 and supplying and discharging the medium, or a wire of a limit switch not shown for detecting an upper limit position or a lower limit position of the table 41. The pipe or the wire are supported and guided by a housing member 8 which is disposed inside the cover 7 and is bendable corresponding to the movement of the table 41.

Figure 7:
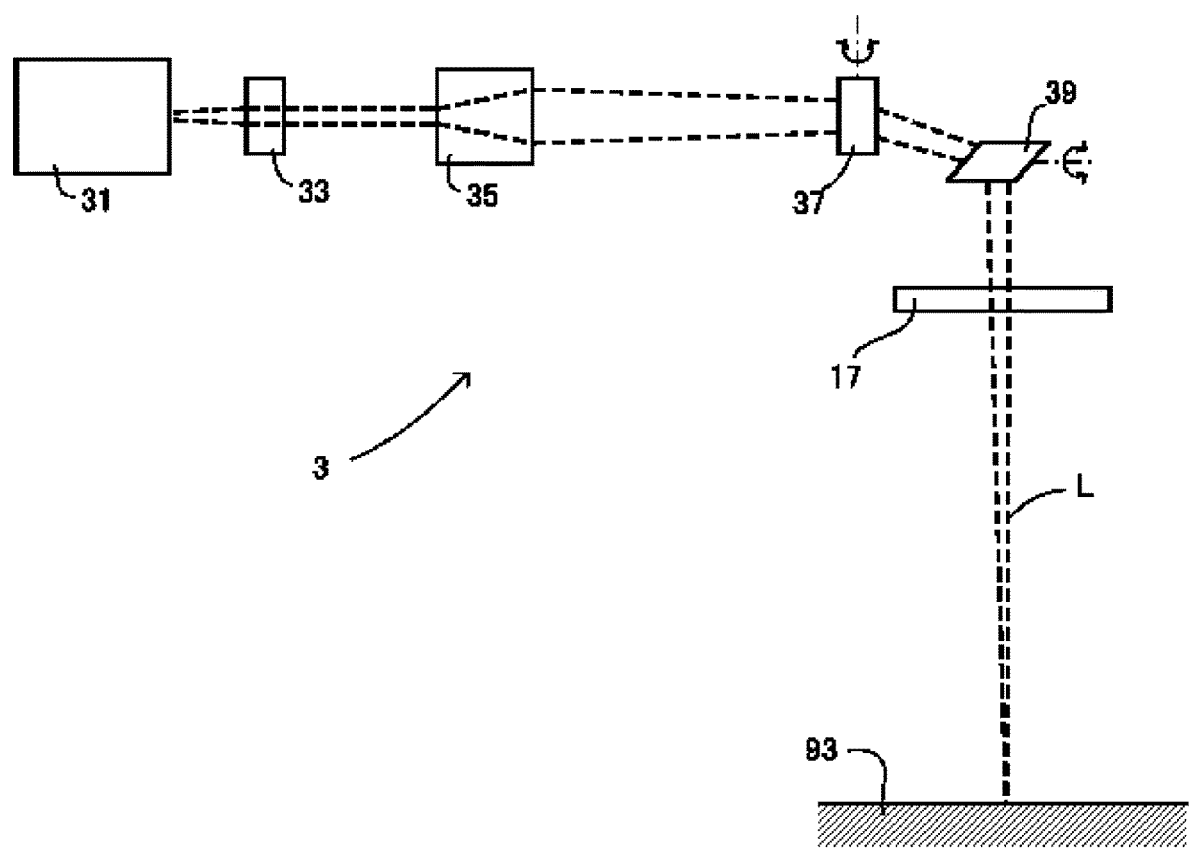
FIG. 7 is a schematic configuration diagram of a laser irradiation device.

The laser irradiation device 3 is disposed above the chamber 11, and the laser beam L output from the laser irradiation device 3 is irradiated through a window 17 disposed in the chamber 11 to a predetermined irradiation region of the material powder layer 93 formed in the molding region R to form the sintered layer 95. The irradiation region is a region in which the sintered layer 95 existing in the molding region R is formed and roughly coincides with a region surrounded by an outline shape of the division layer of the desired three-dimensional molding object. The laser irradiation device 3 includes, for example as shown in FIG. 7, a laser source 31, a collimator 33, a focus control unit 35, and a scanner. The laser source 31 generates and outputs the laser beam L. The collimator 33 converts the laser beam L output from the laser source 31 into parallel light. The focus control unit 35 focuses the laser beam L output from the laser source 31 and adjusts the laser beam L to a desired spot diameter. Specifically, the scanner is a galvano scanner which scans the laser light L two-dimensionally in the molding region R and has a pair of galvano mirrors, namely an X-axis galvano mirror 37 and a Y-axis galvano mirror 39. Rotation angles of the X-axis galvano mirror 37 and the Y-axis galvano mirror 39 are controlled corresponding to rotation angle control signals input from a controller not shown and scanning of the laser beam L are respectively performed in an X-axis direction and a Y-axis direction by the X-axis galvano mirror 37 and the Y-axis galvano mirror 39. A type of the laser beam L is not limited as long as the material powder can be sintered and is, for example, a $CO_2$ laser, a fiber laser, or a YAG laser. The window 17 is formed by a material capable of transmitting the laser beam L. For example, when the laser light L is the fiber laser or the YAG laser, the window 17 can be configured by quartz glass.

A contamination prevention device 19 is arranged to cover the window 17. The contamination prevention device 19 is configured to make the supplied inert gas fill under the window 17 or eject the inert gas downward. In this way, the fume is eliminated from a path of the laser beam L, and contamination of the window 17 due to the fume is prevented.

The lamination molding apparatus 1 further includes a cutting device and may perform cutting processing to the sintered layers 95 during or after the molding. For example, the cutting device has a spindle head which rotates a cutting tool such as an end mill and a processing head in which the spindle head is disposed and which is movable to a desired position. According to the aforementioned cutting device, each time the sintered layers 95 of the predetermined number are formed, cutting processing can be performed on end faces of the sintered layers 95. Alternatively, the cutting device has a turning device for holding a cutting tool such as a tool bit and a processing head on which the turning device is disposed. According to the cutting device above, in the lamination molding object after the molding, a surface parallel to the table 41 and two surfaces perpendicular to the table 41 and perpendicular to each other can be shaped to form reference surfaces for secondary processing.

The embodiments of the disclosure are described as above, but the embodiments are presented as examples and are not intended to limit the scope of the disclosure. These novel embodiments can be implemented in various other forms and can be subjected to various omissions, replacements and changes without departing from the scope of the disclosure. Each technical feature shown in the embodiments can be combined with each other in a scope where no technical contradiction arises. The embodiments and modifications are included in the scope and the gist of the disclosure and are included in the disclosure recited in the scope of claims and in an equivalent scope thereof.

For example, in the lamination molding apparatus 1 of the embodiment, the sintered layers 95 are formed by the laser beam L, but electron beam can also be irradiated in place of the laser beam L, or molten layers can also be formed in place of the sintered layers 95.

In addition, as described above, the table in the embodiments of the disclosure includes not only the molding table but also the material table. That is, in the formation of the material powder layer, a material supply tank and a blade may be arranged in place of the recoater head. The material supply tank stores material powder and has a vertically movable material table. The material powder of the desired quantity is measured by raising the material table. The measured material powder is transferred by the blade to the molding region. In such a lamination molding apparatus, the disclosure is applicable to at least one of the molding table and the material table.

What is claimed is:

1. A lamination molding apparatus, comprising:
   a table;
   powder holding walls which surround the table and hold material powder together with the table;
   a table driving device which comprises a linear actuator for outputting linear motion and a guide for transmitting the linear motion to the table and moving the table in a vertical direction;
   a bucket which is disposed under the table and stores the material powder falling from between the table and the powder holding walls; and
   a cover which is disposed under the table and surrounds the table driving device between the table and the bucket,
   wherein the linear actuator has a screw shaft extending along the vertical direction, a nut screwed to the screw shaft, and a motor rotating the screw shaft,
   the guide has a post through which the screw shaft is inserted, to which the nut is fixed and which is fixed to the table, a bushing through which the post is inserted, and a retainer for holding a rolling body disposed between the post and the bushing, and
   the screw shaft, the nut, the post and the bushing are arranged along the vertical direction.

2. The lamination molding apparatus according to claim 1, wherein the material powder is uniformly spread to each of a plurality of division layers formed by dividing a three-dimensional molding object with a predefined thickness on the table to form material powder layers.

3. The lamination molding apparatus according to claim 1 further comprising a seal which is disposed on a periphery of the table and slides on the powder holding walls during a movement of the table.

4. The lamination molding apparatus according to claim 1, wherein the bucket comprises:
   inner side surfaces surrounding the table driving device;
   outer side surfaces fixed to the powder holding walls; and
   a bottom surface connecting the inner side surfaces and the outer side surfaces.

5. The lamination molding apparatus according to claim 1, wherein the bucket comprises transparent windows through which the material powder being stored can be confirmed.

6. The lamination molding apparatus according to claim 1, wherein the bucket comprises an openable or detachable door for discharging the material powder being stored.

7. The lamination molding apparatus according to claim 1, wherein the bucket comprises a pressure equalization vent through which atmosphere inside the cover and atmosphere outside the cover can flow.

8. The lamination molding apparatus according to claim 7, wherein the pressure equalization vent has a filter for preventing passage of the material powder.

9. The lamination molding apparatus according to claim 1, wherein an upper end of the cover is fixed to the table, and a lower end of the cover is fixed to the bucket.

10. The lamination molding apparatus according to claim 1, wherein the cover is extendable corresponding to a movement of the table.

11. The lamination molding apparatus according to claim 10, wherein the cover has a bellows shape.

12. The lamination molding apparatus according to claim 1 further comprising a housing member arranged inside the cover which is bendable corresponding to a movement of the table and supports and guides a wire or a pipe.

* * * * *